(12) United States Patent
Clark et al.

(10) Patent No.: US 10,777,190 B2
(45) Date of Patent: Sep. 15, 2020

(54) METHOD AND APPARATUS FOR EVALUATING TRIGGER PHRASE ENROLLMENT

(71) Applicant: Google Technology Holdings LLC, Mountain View, CA (US)

(72) Inventors: Joel A. Clark, Woodridge, IL (US); Tenkasi V. Ramabadran, Oswego, IL (US); Mark A. Jasiuk, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 16/216,908

(22) Filed: Dec. 11, 2018

(65) Prior Publication Data

US 2019/0122656 A1 Apr. 25, 2019

Related U.S. Application Data

(63) Continuation of application No. 15/612,693, filed on Jun. 2, 2017, now Pat. No. 10,192,548, which is a (Continued)

(51) Int. Cl.
*G10L 15/00* (2013.01)
*G10L 15/18* (2013.01)
(Continued)

(52) U.S. Cl.
CPC ........ *G10L 15/1807* (2013.01); *G10L 15/063* (2013.01); *G10L 21/0264* (2013.01);
(Continued)

(58) Field of Classification Search
CPC ....... G10L 15/00; G10L 15/01; G10L 15/063; G10L 15/065; G10L 15/07; G10L 15/08; G10L 15/144; G10L 15/146; G10L 15/20; G10L 2015/00; G10L 2015/06; G10L 2015/063; G10L 2015/0636; G10L 2015/088; G10L 2015/223
(Continued)

(56) References Cited

U.S. PATENT DOCUMENTS 4,394,538 A * 7/1983 Warren ................. G10L 15/063
704/251
6,023,676 A 2/2000 Erell
(Continued)

OTHER PUBLICATIONS

Painter et al., "Perceptual Coding of Digital Audio," Proceedings of the IEEE, Apr. 2000, 63 pages.

*Primary Examiner* — Qi Han
(74) *Attorney, Agent, or Firm* — Honigman LLP; Brett A. Krueger

(57) ABSTRACT

An electronic device includes a microphone that receives an audio signal that includes a spoken trigger phrase, and a processor that is electrically coupled to the microphone. The processor measures characteristics of the audio signal, and determines, based on the measured characteristics, whether the spoken trigger phrase is acceptable for trigger phrase model training. If the spoken trigger phrase is determined not to be acceptable for trigger phrase model training, the processor rejects the trigger phrase for trigger phrase model training.

8 Claims, 9 Drawing Sheets

Related U.S. Application Data continuation of application No. 15/609,342, filed on May 31, 2017, now Pat. No. 10,163,439, which is a continuation of application No. 15/605,565, filed on May 25, 2017, now Pat. No. 10,163,438, which is a continuation of application No. 15/384,142, filed on Dec. 19, 2016, now Pat. No. 10,170,105, which is a continuation of application No. 14/050,596, filed on Oct. 10, 2013, now Pat. No. 9,548,047.

(60) Provisional application No. 61/860,730, filed on Jul. 31, 2013.

(51) Int. Cl.
*G10L 15/06* (2013.01)
*G10L 21/0264* (2013.01)
*G10L 25/84* (2013.01)
*G10L 15/08* (2006.01)
*G10L 15/20* (2006.01)

(52) U.S. Cl.
CPC .............. *G10L 25/84* (2013.01); *G10L 15/20* (2013.01); *G10L 2015/088* (2013.01)

(58) Field of Classification Search
USPC ....... 704/244, 231, 233, 235, 246, 249, 250, 704/251, 255
See application file for complete search history.

(56) References Cited

U.S. PATENT DOCUMENTS

| | | |
|---|---|---|
| 2003/0012347 A1 | 1/2003 | Steinbiss et al. |
| 2003/0147510 A1 | 8/2003 | Dams et al. |
| 2007/0192095 A1 | 8/2007 | Braho et al. |
| 2011/0283189 A1 | 11/2011 | McCarty |
| 2013/0225128 A1 | 8/2013 | Gomar |
| 2014/0012586 A1 | 1/2014 | Rubin et al. |
| 2014/0270249 A1 | 9/2014 | Jasiuk et al. |
| 2014/0278435 A1* | 9/2014 | Ganong, III ............ G10L 15/22 704/275 |

* cited by examiner

300

METHOD AND APPARATUS FOR EVALUATING TRIGGER PHRASE ENROLLMENT

CROSS-REFERENCE TO RELATED APPLICATIONS

This application is a continuation of, and claims priority under 35 U.S.C. § 120 from, U.S. patent application Ser. No. 15/612,693, filed on Jun. 2, 2017, which is a continuation of U.S. patent application Ser. No. 15/609,342, filed on May 31, 2017, which is a continuation of U.S. patent application Ser. No. 15/605,565, filed on May 25, 2017, which is a continuation of U.S. patent application Ser. No. 15/384,142, filed on Dec. 19, 2016, which is a continuation of U.S. patent application Ser. No. 14/050,596, filed on Oct. 10, 2013, which claims priority under 35 U.S.C. § 119(e) from, U.S. Provisional Application No. 61/860,730, filed on Jul. 31, 2013. The disclosures of these prior applications are considered part of the disclosure of this application and are hereby incorporated by reference in their entireties.

TECHNICAL FIELD

The present disclosure relates to trigger phrase enrollment and, more particularly, to methods and devices for evaluating trigger phrase enrollment for trigger phrase training.

BACKGROUND

Although speech recognition has been around for decades, the quality of speech recognition software and hardware has only recently reached a high enough level to appeal to a large number of consumers. One area in which speech recognition has become very popular in recent years is the smartphone and tablet computer industry. Using a speech recognition-enabled device, a consumer can perform such tasks as making phone calls, writing emails, and navigating with GPS using only voice commands.

Speech recognition in such devices is far from perfect, however. When using a speech recognition-enabled device for the first time, the user may need to "train" the speech recognition software to recognize his or her voice. Even after training, however, the speech recognition functions may not work well in all sound environments. For example, the presence of background noise can decrease speech recognition accuracy.

In an always-on audio (AOA) system, a speech recognition-enabled device continuously listens for the occurrence of a trigger phrase. The trigger phrase, when detected, alerts the device that the user is about to issue a voice command or a sequence of voice commands, which are then processed by a speech recognition engine in the device. The system, by continuously listening for the occurrence of a trigger phrase, frees the user from having to manually signal to the device that the voice command mode is being entered, eliminating the need for an action such as pressing a physical button or a virtual button or control via the device touch screen.

In the AOA system, it is advantageous for the user to train the trigger phrase recognizer for the user's voice. This allows the trigger phrase recognizer to adapt the trigger phrase recognition models to the user's voice, thus improving the trigger phrase recognizer accuracy, and also to employ speaker recognition to help reject the trigger phrase when it is spoken by a person other than the user. For these advantages to be realized the user must go through the enrollment process to adapt the trigger phrase model to the user's voice. The enrollment process, in an example, involves the user being prompted to say the trigger phrase multiple times (e.g., three times), while being in an acoustically quiet environment. The three utterances of the trigger phrase, captured by a microphone in the device, are digitally sampled, and used for trigger phrase model training. For the training to yield high quality trigger phrase models tailored to the user's voice, the three instances of the trigger phrase recordings, made by the user in the enrollment process, should ideally have low background noise level, which has preferably stationary (i.e., not fluctuating with respect to time) characteristics, and not include tongue clicks, device handling noise, or other spurious non-speech sounds, such as pops, or clicks. If the enrollment recordings of the trigger phrase do not satisfy the above requirements, the trigger phrase models adapted to the user will be of poor quality, resulting in degraded trigger phrase recognition accuracy.

DRAWINGS

While the appended claims set forth the features of the present techniques with particularity, these techniques may be best understood from the following detailed description taken in conjunction with the accompanying drawings of which:

DESCRIPTION

Figure 1:
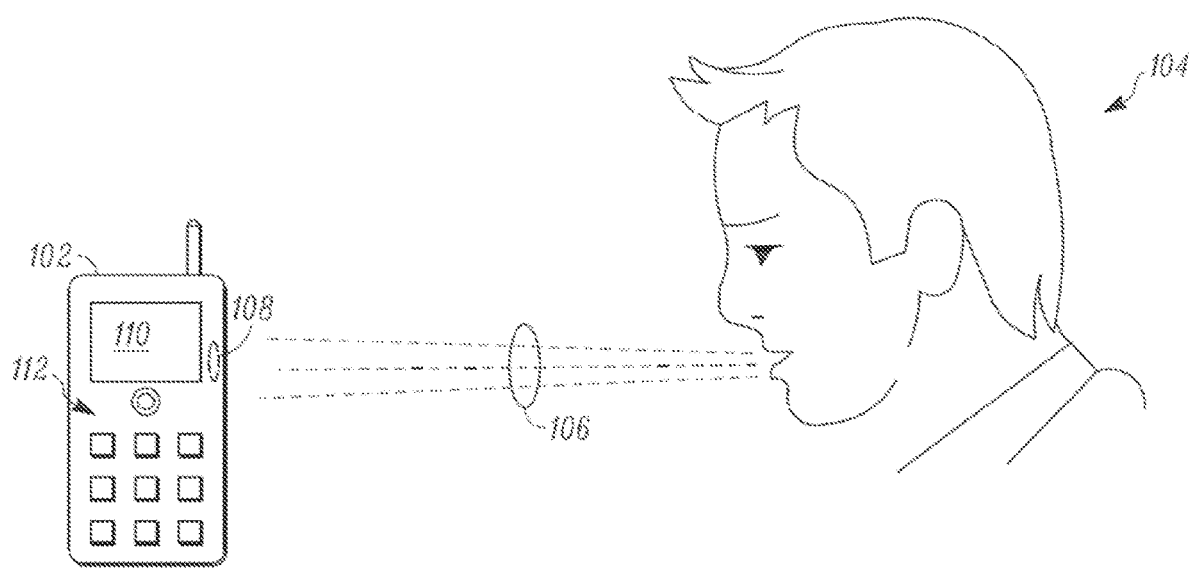
FIG. 1 shows a user speaking to an electronic device, which is depicted as a mobile device in the drawing.

The present disclosure sets forth a method and apparatus for evaluating trigger phrase enrollment for trigger phrase training.

In an embodiment, an electronic device includes a microphone that receives an audio signal that includes a spoken trigger phrase, and a processor that is electrically coupled to the microphone. The processor measures characteristics of the recorded audio signal, and determines, based on the measured characteristics, whether the spoken trigger phrase is acceptable for trigger phrase model training. If the spoken trigger phrase is determined not to be acceptable for trigger phrase model training, the processor rejects the trigger phrase for trigger phrase model training.

In another embodiment, an electronic device records an audio signal including a spoken trigger phrase. The device measures a background noise level in the audio signal, and compares the measured background noise level to a threshold level. Based on the comparison, the device then determines whether the spoken trigger phrase is acceptable for trigger phrase model training. If the spoken trigger phrase is determined not to be acceptable for trigger phrase model training, the device rejects the spoken trigger phrase for trigger phrase model training.

The device may determine whether the measured background noise level is greater than the threshold level. If the measured background noise level is determined to be greater than the threshold level, the device determines that the spoken trigger phrase is not acceptable for trigger phrase model training. In an embodiment, the threshold level may be about −50 dB.

In yet another embodiment, an electronic device records an audio signal including a spoken trigger phrase. The device estimates the length of the spoken trigger phrase in the audio signal, and determines whether the estimated length of the spoken trigger phrase is less than a lower trigger phrase length threshold. If the estimated length of the spoken trigger phrase is less than the lower trigger phrase length threshold, the device rejects the spoken trigger phrase for trigger phrase model training.

To estimate the length of the spoken trigger phrase, the device may count the number of frames in the audio signal having voice activity. In an embodiment, the lower trigger phrase length threshold may be about 70 frames.

In still another embodiment, an electronic device records an audio signal including a spoken trigger phrase. The device estimates the length of the spoken trigger phrase in the audio signal, and determines whether the estimated length of the spoken trigger phrase is greater than a higher trigger phrase length threshold. If the estimated length of the spoken trigger phrase is greater than the higher trigger phrase length threshold, the device rejects the spoken trigger phrase for trigger phrase model training.

To estimate the length of the spoken trigger phrase, the device may count the number of frames having voice activity in the audio signal. In an embodiment, the higher trigger phrase length threshold may be about 180 frames.

In an embodiment, an electronic device records an audio signal including a spoken trigger phrase. The device measures a number of segments in the audio signal having voice activity, and compares the measured number of segments to a threshold value. Based on the comparison, the device determines whether the spoken trigger phrase is acceptable for trigger phrase model training. If the spoken trigger phrase is determined not to be acceptable for trigger phrase model training, the device rejects the spoken trigger phrase for trigger phrase model training.

The device may determine whether the measured number of segments is greater than the threshold value. If the measured number of segments is determined to be greater than the threshold value, the device determines that the spoken trigger phrase is not acceptable for trigger phrase model training. In an embodiment, the threshold value may be based on an offline analysis of the trigger phrase.

In another embodiment, an electronic device records an audio signal including a spoken trigger phrase. The device measures the length of the shortest segment in the audio signal having voice activity, and compares the measured length of the shortest segment to a threshold value. Based on the comparison, the device determines whether the spoken trigger phrase is acceptable for trigger phrase model training. If the spoken trigger phrase is determined not to be acceptable for trigger phrase model training, the device rejects the spoken trigger phrase for trigger phrase model training.

The device may determine whether the measured length of the shortest segment is less than the threshold value. If the measured length of the shortest segment is determined to be less than the threshold value, the device determines that the spoken trigger phrase is not acceptable for trigger phrase model training. In an embodiment, the threshold value may be about 27 frames.

In yet another embodiment, an electronic device records an audio signal including a spoken trigger phrase. The device calculates a measure of noise variability of background noise for each frame in the audio signal, and compares the measure of noise variability of background noise for each frame to a first threshold value. The device then counts the number of frames in the audio signal for which the measure of noise variability of the background noise is higher than the first threshold value, and compares the counted number of frames to a second threshold value. Based on the counted number of frames, the device determines whether the spoken trigger phrase is acceptable for trigger phrase model training. If the spoken trigger phrase is determined not to be acceptable for trigger phrase model training, the device rejects the spoken trigger phrase for trigger phrase model training.

The device may determine whether the counted number of frames is equal to or greater than the second threshold value. If the counted number of frames is determined to be equal to or greater than the second threshold value, the device determines that the spoken trigger phrase is not acceptable for trigger phrase model training. In an embodiment, the first threshold value may be about 0.7, and the second threshold value may be about 20.

To calculate the measure of noise variability of the background noise, the device may use the following equation:

$$MNV = \frac{1}{NC \times nb} \sum_{k=1}^{NC} \sum_{l=1}^{nb} \frac{(D\_smooth(k, l) - D\_smooth\_low(k, l))}{(D\_smooth\_high(k, l) - D\_smooth\_low(k, l))},$$

wherein MNV denotes the measure noise variability of the background noise in the audio signal, NC denotes a number of channels in the audio signal, nb+1 denotes a number of contiguous noise frames in the audio signal, k denotes a channel index, l denotes a look-back index, D_smooth(k, l) denotes a smoothed maximum dB difference of smoothed channel noise, D_smooth_high(k, l) denotes a high boundary point that represents noise exhibiting high variability, and D_smooth_low (k, l) denotes a low boundary point that represents noise exhibiting low variability. In an embodiment, MNV may be bounded between 0 and 1.

The embodiments described herein are usable in the context of always-on audio (AOA). When using AOA, the device 102 (FIG. 1) is capable of waking up from a sleep mode upon receiving a trigger command (i.e., a trigger phrase) from a user. AOA places additional demands on devices, especially mobile devices. AOA is most effective when the device 102 is able to recognize the user's voice commands accurately and quickly.

Referring to FIG. 1, a user 104 provides voice input (or vocalized information or speech) 106 that is received by a speech recognition-enabled electronic device ("device") 102 by way of a microphone (or other sound receiver) 108. The device 102, which is a mobile device in this example, includes a touch screen display 110 that is able to display visual images and to receive or sense touch type inputs as provided by way of a user's finger or other touch input device such as a stylus. Notwithstanding the presence of the touch screen display 110, in the embodiment shown in FIG. 1, the device 102 also has a number of discrete keys or buttons 112 that serve as input devices of the device. However, in other embodiments such keys or buttons (or any particular number of such keys or buttons) need not be present, and the touch screen display 110 can serve as the primary or only user input device.

Although FIG. 1 particularly shows the device 102 as including the touch screen display 110 and keys or buttons 112, these features are only intended to be examples of components/features on the device 102, and in other embodiments the device 102 need not include one or more of these features and/or can include other features in addition to or instead of these features.

The device 102 is intended to be representative of a variety of devices including, for example, cellular telephones, personal digital assistants (PDAs), smart phones, or other handheld or portable electronic devices. In alternate embodiments, the device can also be a headset (e.g., a Bluetooth headset), MP3 player, battery-powered device, a watch device (e.g., a wristwatch) or other wearable device, radio, navigation device, laptop or notebook computer, netbook, pager, PMP (personal media player), DVR (digital video recorders), gaming device, camera, e-reader, e-book, tablet device, navigation device with video capable screen, multimedia docking station, or other device.

Embodiments of the present disclosure are intended to be applicable to any of a variety of electronic devices that are capable of or configured to receive voice input or other sound inputs that are indicative or representative of vocalized information.

Figure 2:
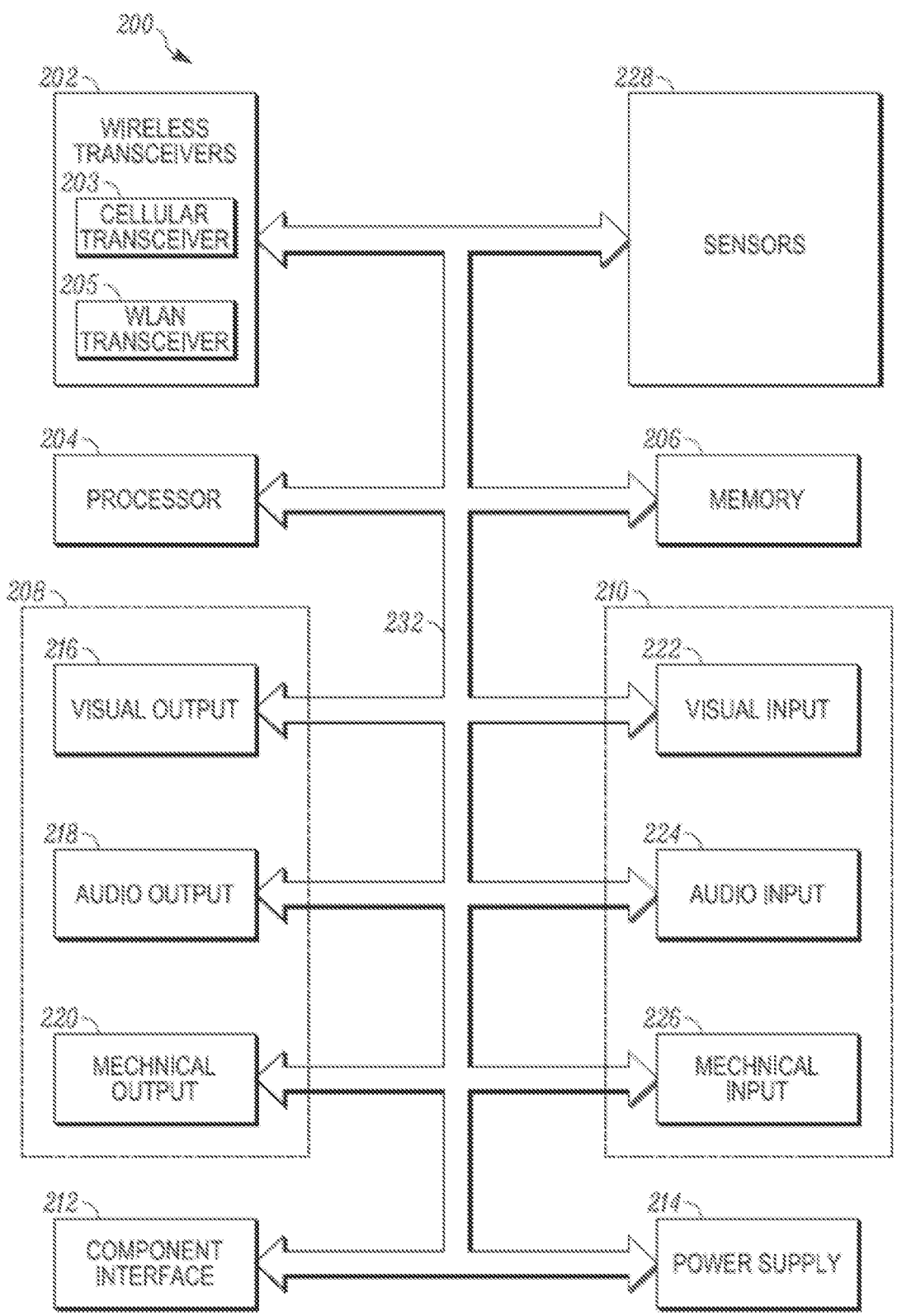
FIG. 2 shows example components of the electronic device of FIG. 1.

FIG. 2 shows internal components of the device 102 of FIG. 1, in accordance with an embodiment of the disclosure. As shown in FIG. 2, the internal components 200 include one or more wireless transceivers 202, a processor 204 (e.g., a microprocessor, microcomputer, application-specific integrated circuit, etc.), a memory portion 206, one or more output devices 208, and one or more input devices 210. The internal components 200 can further include a component interface 212 to provide a direct connection to auxiliary components or accessories for additional or enhanced functionality. The internal components 200 may also include a power supply 214, such as a battery, for providing power to the other internal components while enabling the mobile device to be portable. Further, the internal components 200 additionally include one or more sensors 228. All of the internal components 200 can be coupled to one another, and in communication with one another, by way of one or more internal communication links 232 (e.g., an internal bus).

Further, in the embodiment of FIG. 2, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, vis-à-vis cell towers (not shown), albeit in other embodiments, the cellular transceiver 203 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Although in the present embodiment the device 102 has two of the wireless transceivers 202 (that is, the transceivers 203 and 205), the present disclosure is intended to encompass numerous embodiments in which any arbitrary number of wireless transceivers employing any arbitrary number of communication technologies are present. By virtue of the use of the wireless transceivers 202, the device 102 is capable of communicating with any of a variety of other devices or systems (not shown) including, for example, other mobile devices, web servers, cell towers, access points, other remote devices, etc. Depending upon the embodiment or circumstance, wireless communication between the device 102 and any arbitrary number of other devices or systems can be achieved.

Operation of the wireless transceivers 202 in conjunction with others of the internal components 200 of the device 102 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as the microphone 108 of FIG. 1 (or further for example a microphone of a Bluetooth headset), and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As mentioned above, the internal components 200 also can include one or more of various types of sensors 228 as well as a sensor hub to manage one or more functions of the sensors. The sensors 228 may include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the device 102. Although the sensors 228 for the purposes of FIG. 2 are considered to be distinct from the input devices 210, in other embodiments it is possible that one or more of the input devices can also be considered to constitute one or more of the sensors (and vice-versa). Additionally, although in the present embodiment the input devices 210 are shown to be distinct from the output devices 208, it should be recognized that in some embodiments one or more devices serve both as input device(s) and output device(s). In particular, in the present embodiment in which the device 102 includes the touch screen display 110, the touch screen display can be considered to constitute both a visual output device and a mechanical input device (by contrast, the keys or buttons 112 are merely mechanical input devices).

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 206 of the device 102 can be supplemented or replaced by other memory portion(s) located elsewhere apart from the mobile device and, in such embodiments, the mobile device can be in communication with or access such other memory device(s) by way of any of various communications techniques, for example, wireless communications afforded by the wireless transceivers 202, or connections via the component interface 212.

The data that is stored by the memory portion 206 can include, but need not be limited to, operating systems, programs (applications), modules, and informational data. Each operating system includes executable code that controls basic functions of the device 102, such as interaction among the various components included among the internal components 200, communication with external devices via the wireless transceivers 202 and/or the component interface 212, and storage and retrieval of programs and data, to and from the memory portion 206. As for programs, each program includes executable code that utilizes an operating system to provide more specific functionality, such as file system service and handling of protected and unprotected data stored in the memory portion 206. Such programs can include, among other things, programming for enabling the device 102 to perform a process such as the process for speech recognition shown in FIG. 3 and discussed further below. Finally, with respect to informational data, this is non-executable code or information that can be referenced and/or manipulated by an operating system or program for performing functions of the device 102.

Figure 3:
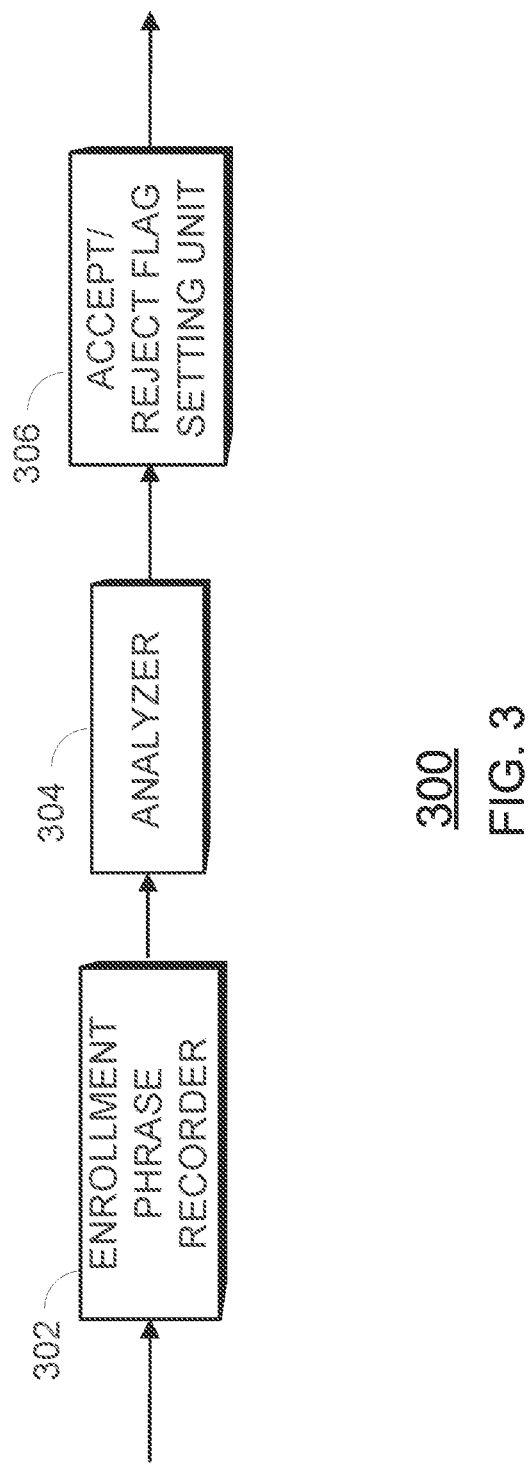
FIG. 3 shows example modules of a processor of the electronic device of FIG. 1.

FIG. 3 shows example modules of a processor 300 of the electronic device of FIG. 1, in accordance with an embodiment of the disclosure. The processor 300 may be an example of the processor 204 shown in FIG. 2. As shown in FIG. 3, the processor 300 includes an enrollment phrase recorder 302, an analyzer 304, and an accept/reject flag setting unit 306.

During the enrollment process, the device 102 prompts a user to speak the trigger phrase into the microphone 108 (FIG. 1). The enrollment phrase recorder 302 records the spoken trigger phrase so that the recorded audio signal can be analyzed by the analyzer 304. For each frame of the recorded audio signal, the analyzer 304 measures the channel energies and background noise energies of the recorded audio signal. Based on the measured channel energies and background noise energies in the spectral domain, the analyzer 304 sets the Voice Activity Detection (VAD) flag for the frame. If the analyzer 304 determines that the frame being analyzed contains voice activity, the analyzer 304 sets the VAD flag to 1. Otherwise, the analyzer 304 sets the VAD flag to 0.

Furthermore, the analyzer 304 analyzes various characteristics of the spoken trigger phrase in the recorded audio signal, and compares the characteristics with predetermined threshold values. Then, the analyzer 304 outputs the results of the comparisons to the accept/reject flag setting unit 306. The accept/reject flag setting unit 306 uses the results of the comparisons from the analyzer 304 to set either an "Accept Enrollment" flag or an "Reject Enrollment" flag. If the accept/reject flag setting unit 306 sets the "Reject Enrollment" flag, the device 102 may prompt the user to redo the enrollment recording.

In order to determine and set the threshold values, the characteristics of valid instances of the trigger phrase are first identified. This analysis may be performed offline. The characteristics being analyzed may include background noise level of the instances of the trigger phrase, length of the trigger phrase (e.g., number of frames in the instances of the trigger phrase having voice activity), number of segments in the instances of the trigger phrase having voice activity, the length (e.g., number of frames) in the shortest segment, and a measure of noise variability of the background noise (e.g., car noise exhibits low noise variability while babble noise exhibits high noise variability). Based on the analysis, various threshold values may be assigned to each of the analyzed characteristics and stored in the memory 206 for use by the analyzer 304.

Figure 4:
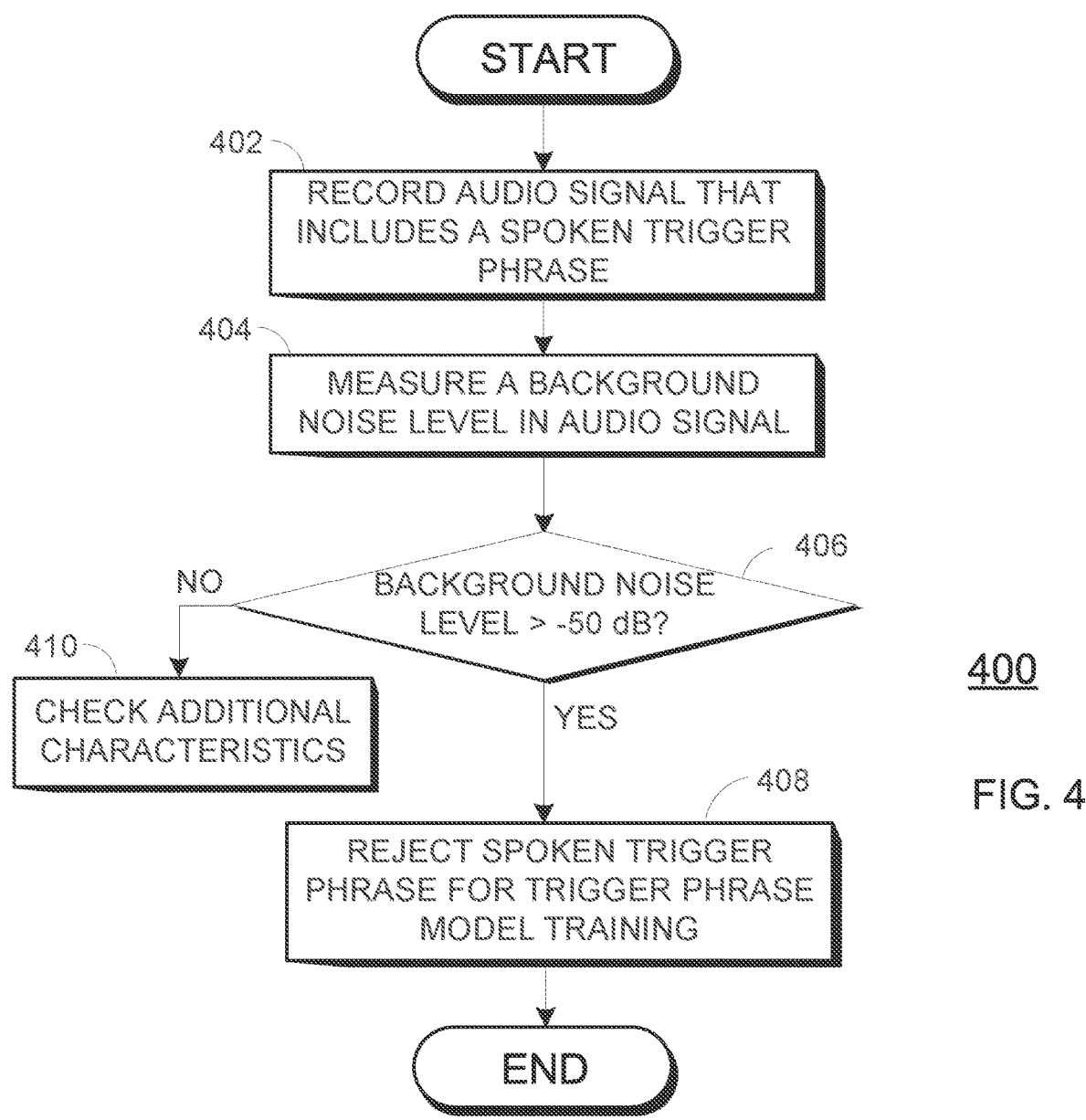
FIGS. 4-9 show steps that may be carried out according to various embodiments.

Referring to FIG. 4, a procedure 400 carried out by the electronic device 102 (FIG. 1) according to an embodiment will now be described. In the present embodiment, the trigger phrase is "Okay Google Now." In other embodiments, however, other trigger phrases may be used.

At step 402, the device 102 records an audio signal that includes a spoken trigger phrase. At step 404, the device 102 measures a background noise level in the audio signal. Next, at step 406, the device 102 compares the measured background noise level to a threshold level. The device 102 may determine whether the measured background noise level is greater than the threshold level. If the measured background noise level is determined to be greater than the threshold level (i.e., there is a high level of background noise present in the recorded audio signal), the device 102 determines that the spoken trigger phrase is not acceptable for trigger phrase model training. In the present embodiment, the threshold level may be about −50 dB.

Based on the result of the comparison from step 406, the device 102 determines whether the spoken trigger phrase is acceptable for trigger phrase model training. If the measured background noise level is determined to be greater than the threshold level (YES of step 406), the device 102 rejects the spoken trigger phrase for trigger phrase model training at step 408. Otherwise, the device 102 will check additional characteristics of the spoken trigger phrase to determine whether the spoken trigger phrase is acceptable for trigger phrase model training at step 410.

Figure 5:
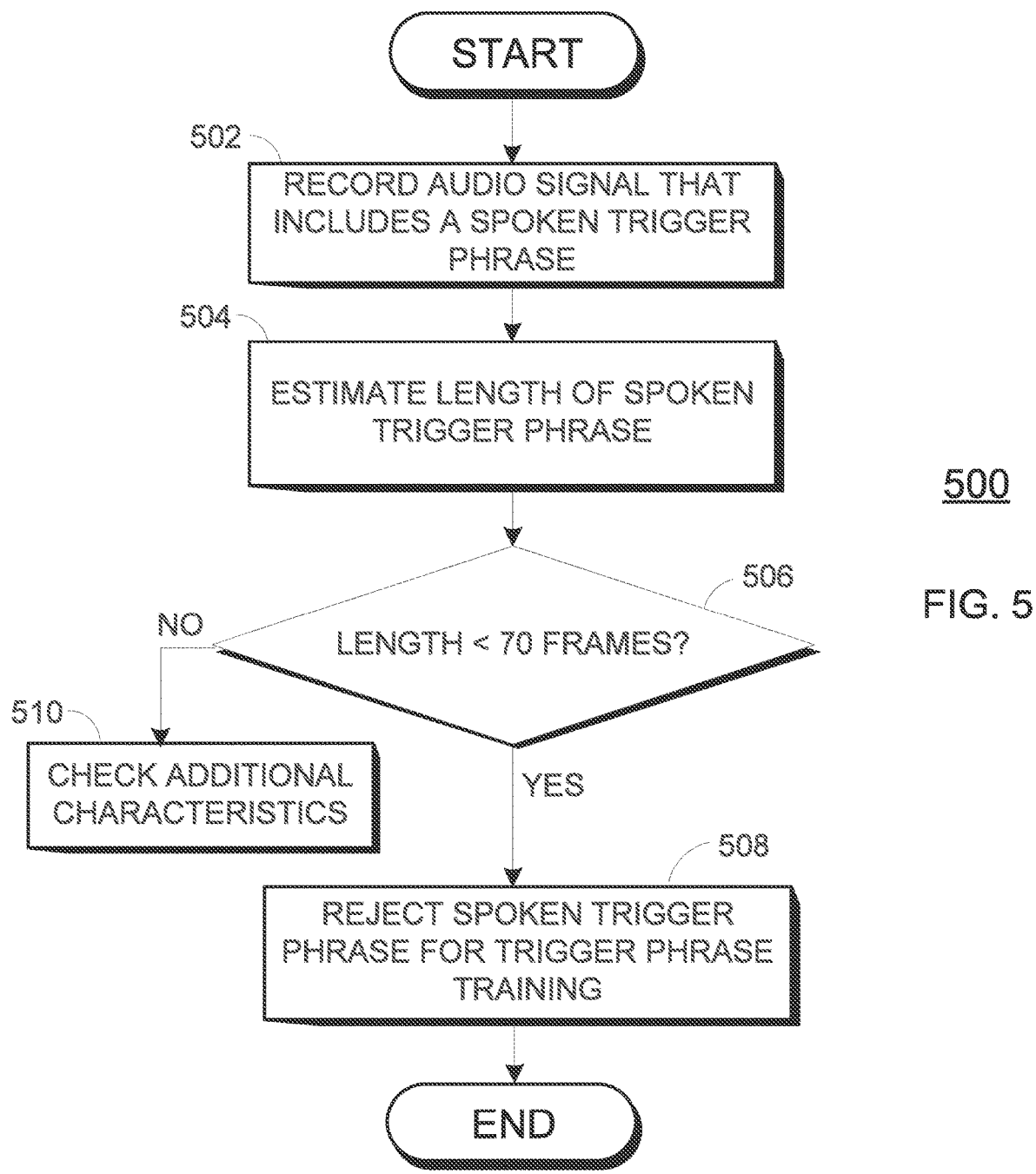

Referring to FIG. 5, a procedure 500 carried out by the electronic device 102 (FIG. 1) according to another embodiment will now be described. In the present embodiment, the trigger phrase is "Okay Google Now." In other embodiments, however, other trigger phrases may be used.

At step 502, the device 102 records an audio signal that includes a spoken trigger phrase. At step 504, the device 102 estimates the length of the spoken trigger phrase in the audio signal. In an embodiment, to estimate the length of the spoken trigger phrase, the device 102 may count the number of frames in the audio signal having voice activity (i.e., VAD flag=1).

Next, at step 506, the device 102 compares the estimated length of the spoken trigger phrase to a lower trigger phrase length threshold to determine whether the estimated length of the spoken trigger phrase is less than the lower trigger phrase length threshold (i.e., whether the recorded phrase is too short). If the estimated length of the spoken trigger phrase is less than the lower trigger phrase length threshold (YES of step 506), the device 102 rejects the spoken trigger phrase for trigger phrase model training at step 508. Otherwise, the device 102 will check additional characteristics of the spoken trigger phrase to determine whether the spoken trigger phrase is acceptable for trigger phrase model training at step 510. In the present embodiment, the lower trigger phrase length threshold may be about 70 frames, and each frame may be of 10 ms duration.

Figure 6:
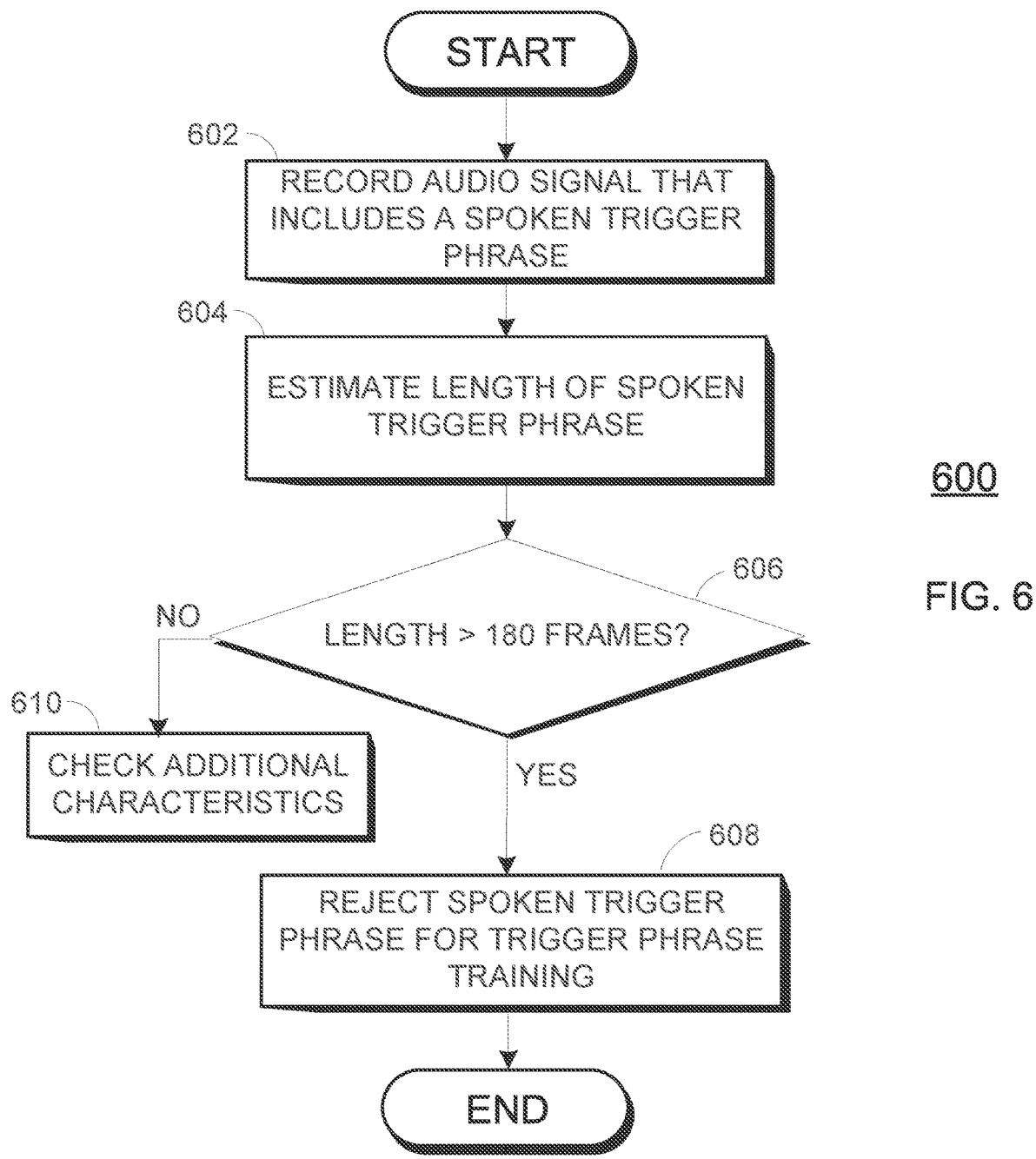

Referring to FIG. 6, a procedure 600 carried out by the electronic device 102 (FIG. 1) according to yet another embodiment will now be described. In the present embodiment, the trigger phrase is "Okay Google Now." In other embodiments, however, other trigger phrases may be used.

At step 602, the device 102 records an audio signal that includes a spoken trigger phrase. At step 604, the device 102 estimates the length of the spoken trigger phrase in the audio signal. In an embodiment, to estimate the length of the spoken trigger phrase, the device 102 may count the number of frames in the audio signal having voice activity (i.e., VAD flag=1).

Next, at step 606, the device 102 compares the estimated length of the spoken trigger phrase to a higher trigger phrase length threshold to determine whether the estimated length of the spoken trigger phrase is greater than the higher trigger phrase length threshold (i.e., whether the recorded phrase is too long). If the estimated length of the spoken trigger phrase is greater than the higher trigger phrase length threshold (YES of step 606), the device 102 rejects the spoken trigger phrase for trigger phrase model training at step 608. Otherwise, the device 102 will check additional characteristics of the spoken trigger phrase to determine whether the spoken trigger phrase is acceptable for trigger phrase model training at step 610. In the present embodiment, the higher trigger phrase length threshold may be about 180 frames.

Figure 7:
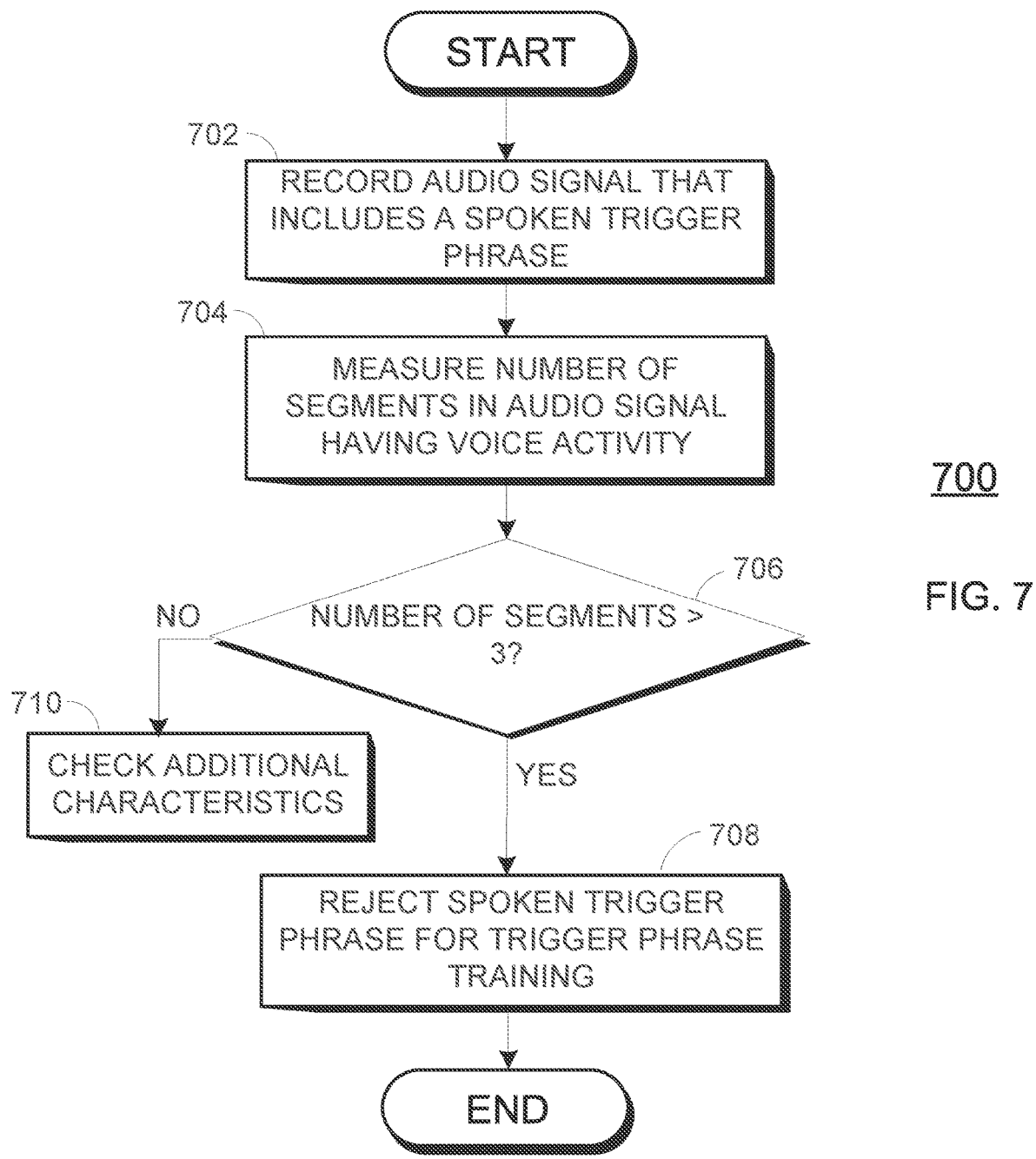

Referring to FIG. 7, a procedure 700 carried out by the electronic device 102 (FIG. 1) according to still another embodiment will now be described. In the present embodiment, the trigger phrase is "Okay Google Now." In other embodiments, however, other trigger phrases may be used.

At step 702, the device 102 records an audio signal that includes a spoken trigger phrase. At step 704, the device 102 measures a number of segments in the audio signal having voice activity. A segment is defined here as a sequence of contiguous frames.

Next, at step 706, the device 102 compares the measured number of segments to a threshold value. The device 102 may determine whether the measured number of segments is greater than the threshold value. If the measured number of segments is determined to be greater than the threshold value (YES at step 706), the device 102 determines that the spoken trigger phrase is not acceptable for trigger phrase model training and rejects the spoken trigger phrase at step 708. Otherwise, the device 102 will check additional characteristics of the spoken trigger phrase to determine whether the spoken trigger phrase is acceptable for trigger phrase model training at step 710.

The threshold value for the number of segments may be based on an offline analysis of the trigger phrase. The analysis may take into account the number of words or syllables in the trigger phrase. In the present embodiment, since the trigger phrase is "Okay Google Now" (i.e., 3 words), the threshold value is set to 3.

Figure 8:
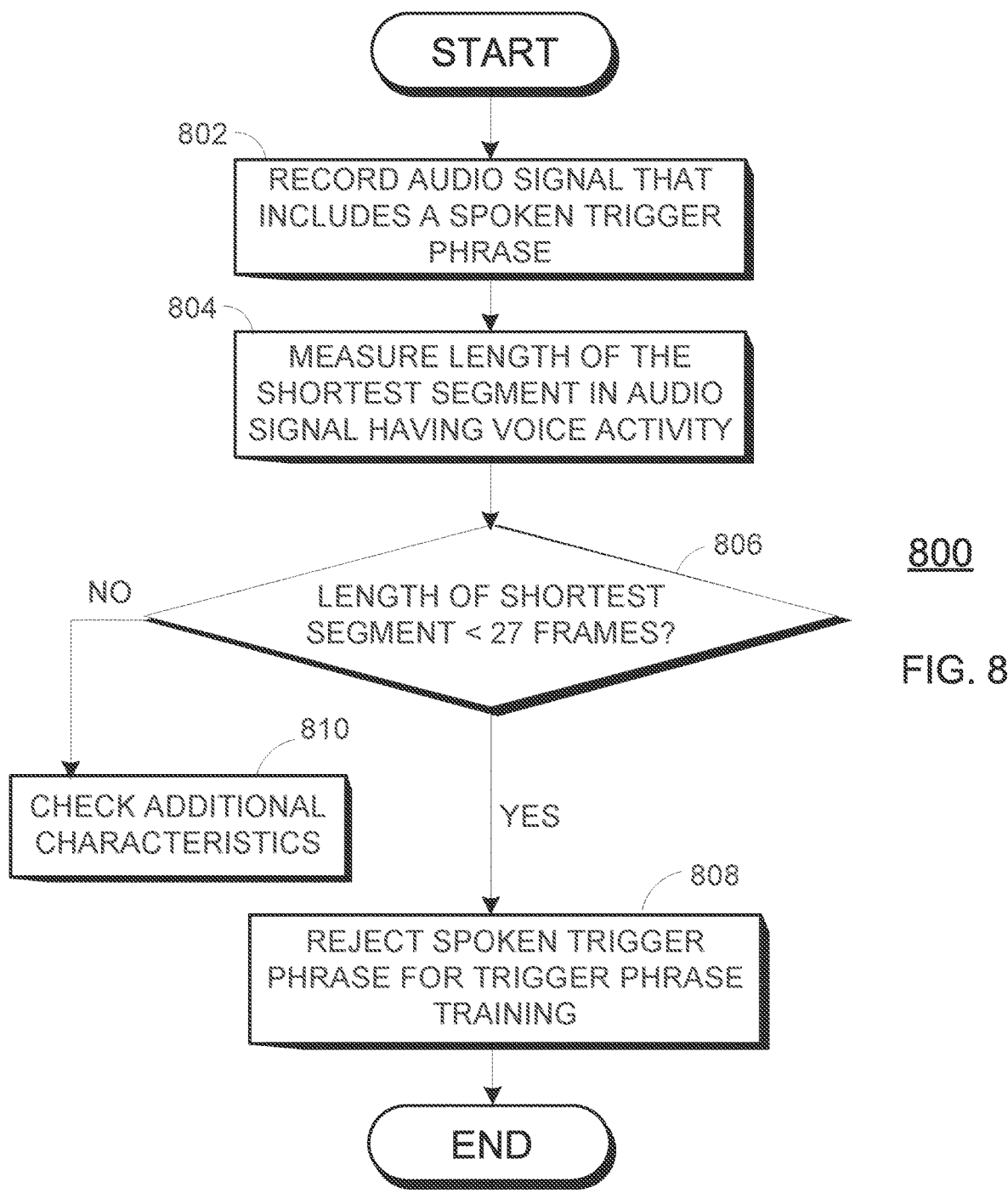

Referring to FIG. 8, a procedure 800 carried out by the electronic device 102 (FIG. 1) according to an embodiment will now be described. In the present embodiment, the trigger phrase is "Okay Google Now." In other embodiments, however, other trigger phrases may be used.

At step 802, the device 102 records an audio signal that includes a spoken trigger phrase. At step 804, the device 102 measures the length of the shortest segment in the audio signal having voice activity (i.e., VAD flag=1). In an embodiment, to estimate the length of the shortest segment with voice activity, the device 102 may count the number of segments in the audio signal and/or the number of frames in each segment that have voice activity.

Next, at step 806, the device 102 compares the measured length of the shortest segment to a threshold value. The device 102 may determine whether the measured length of the shortest segment is less than the threshold value (i.e., indicating the presence of a "pop" or "click" sound in the recorded audio signal). If the measured length of the shortest segment is determined to be less than the threshold value (YES of step 806), the device determines that the spoken trigger phrase is not acceptable for trigger phrase model training and rejects the spoken trigger phrase at step 808. Otherwise, the device 102 will check additional characteristics of the spoken trigger phrase to determine whether the spoken trigger phrase is acceptable for trigger phrase model training at step 810. In the present embodiment, the threshold value for the length of the shortest segment may be about 27 frames.

Figure 9:
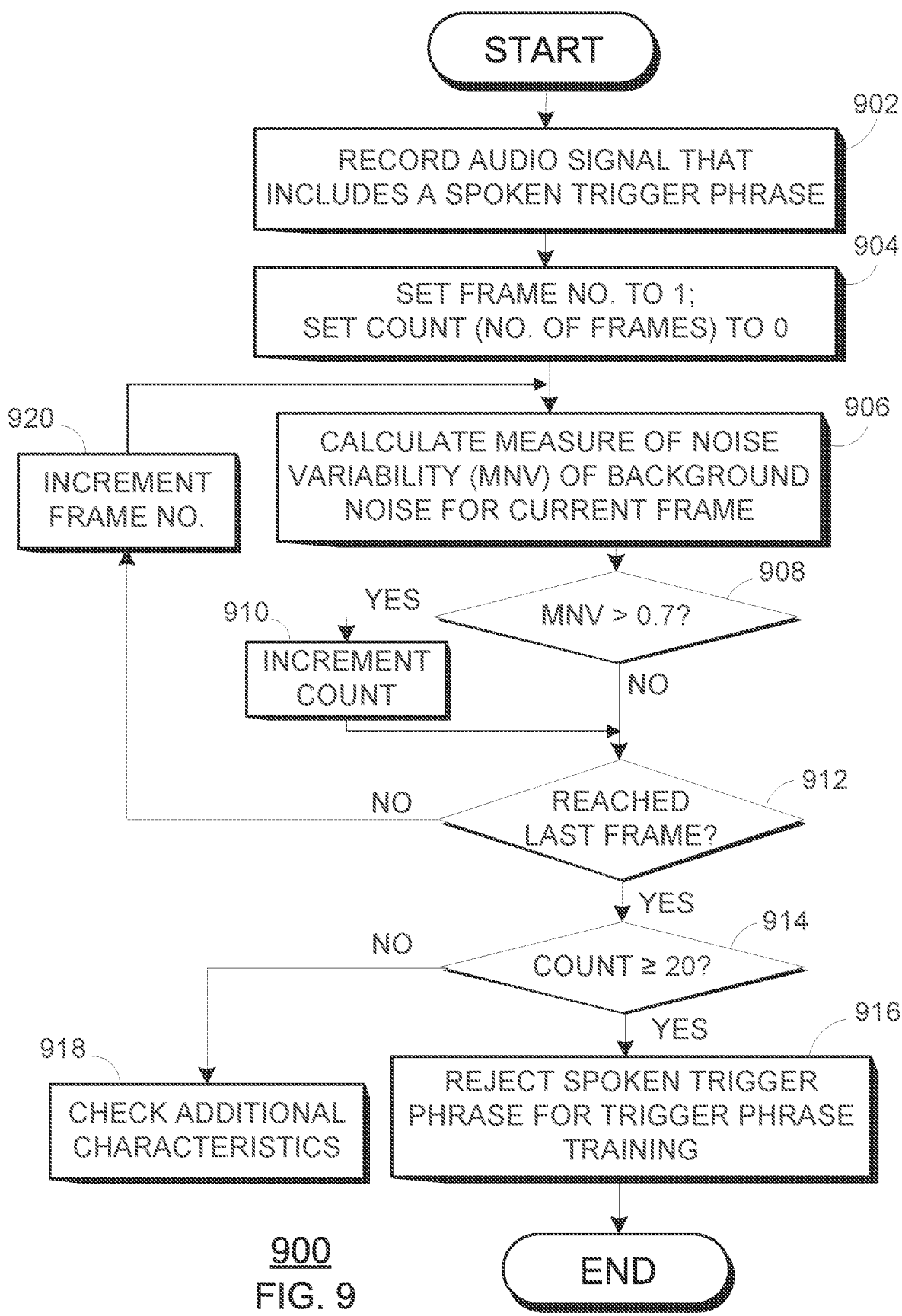

Referring to FIG. 9, a procedure 900 carried out by the electronic device 102 (FIG. 1) according to a further embodiment will now be described. In the present embodiment, the trigger phrase is "Okay Google Now." In other embodiments, however, other trigger phrases may be used.

At step 902, the device 102 records an audio signal that includes a spoken trigger phrase. The audio signal is made up of frames. At step 904, the device 102 sets the frame number to 1 (i.e., the first frame is the current frame) and sets COUNT (number of frames counted) to 0. At step 906, the device 102 calculates a measure of noise variability of background noise for the current frame in the audio signal. Then at step 908, the device 102 compares the measure of noise variability of background noise for the current frame to a first threshold value.

To calculate the measure of noise variability of the background noise, the device 102 may use the following equation:

$$MNV = \frac{1}{NC \times nb} \sum_{k=1}^{NC} \sum_{l=1}^{nb} \frac{(D\_smooth(k, l) - D\_smooth\_low(k, l))}{(D\_smooth\_high(k, l) - D\_smooth\_low(k, l))},$$

wherein MNV denotes the measure noise variability of the background noise of the audio signal, NC denotes a number of channels of the audio signal, nb+1 denotes a number of contiguous noise frames of the audio signal, k denotes a channel index, l denotes a look-back index, D_smooth(k, l) denotes a smoothed maximum dB difference of smoothed channel noise, D_smooth_high(k, l) denotes a high boundary point that represents noise exhibiting high variability, and D_smooth_low (k, l) denotes a low boundary point that represents noise exhibiting low variability. In an embodiment, MNV may be bounded between 0 and 1. The measure of noise variability (MNV) typically ranges from 0 to 1 with low values corresponding to low variability noise signals (e.g., car noise) and high values corresponding to high variability noise signals (e.g., babble noise). For a more detailed discussion of the measure of noise variability, see U.S. patent application Ser. No. 13/950,980 entitled "METHOD AND APPARATUS FOR ESTIMATING VARIABILITY OF BACKGROUND NOISE FOR NOISE SUPPRESSION" filed on Jul. 25, 2013, which is hereby incorporated herein by reference in its entirety.

Next, if the device 102 determines that the measure of noise variability for the current frame is greater than the first threshold value (YES of step 908), then the device 102 increments COUNT at step 910. Once the device 102 increments COUNT, the device 102 determines whether the last frame of the audio signal has been reached at step 912. If the device 102 determines that the measure of noise variability for the current frame is equal to or less than the first threshold value (NO of step 908), the device 102 does not increment COUNT but proceeds directly to step 912 to determine whether the last frame of the audio signal has been reached. If the last frame of the audio signal has been reached (YES of step 912), the device 102 proceeds to step 914. On the other hand, if the last frame has not been reached (NO of step 912), the device 102 then increments the frame number at step 920 (i.e., the current frame is now the incremented frame) and returns to step 906.

At step 914, the device 102 compares the number of frames in the audio signal for which the measure of noise variability of the background noise is higher than the first threshold value (e.g., background noise exhibits high noise variability, such as babble noise) to a second threshold value (i.e., whether COUNT≥second threshold value). If the counted number of frames is greater than or equal to the second threshold value (YES of step 914), the device 102 determines that the spoken trigger phrase is not acceptable for trigger phrase model training and rejects the spoken trigger phrase at step 916. Otherwise, the device 102 will check additional characteristics of the spoken trigger phrase to determine whether the spoken trigger phrase is acceptable for trigger phrase model training at step 918. In the present embodiment, the first threshold value may be about 0.7, and the second threshold value may be about 20. Furthermore, in another embodiment, the device 102 may enable counting of the number of frames only when the VAD flag is set to 0.

In the various embodiments, the threshold values are dependent on the particular characteristics of a trigger phrase. Therefore, the threshold values may vary based on the number of words, syllables, or phonemes in a trigger phrase. Accordingly, the threshold values presented in the current disclosure are exemplary only and should not be construed as limiting. Furthermore, the method and apparatus disclosed herein may be adapted and employed for enrollment recordings of various trigger phrases.

All signal/noise dB values presented in the current disclosure are dB-FS, i.e. dB, (full-scale). This means that when the signal is full-scale (e.g. +/−32768 for 16-bit representation of signal samples), the corresponding reference dB level is 0.

Example 1

A method comprising: recording an audio signal including a spoken trigger phrase; measuring a background noise level in the audio signal; comparing the measured background noise level to a threshold level; determining, based on the comparing step, whether the spoken trigger phrase is acceptable for trigger phrase model training; and if the spoken trigger phrase is determined not to be acceptable for trigger phrase model training, rejecting the spoken trigger phrase for trigger phrase model training.

Example 2

The method of example 1, wherein the determining step comprises: determining whether the measured background noise level is greater than the threshold level; and if the measured background noise level is determined to be greater than the threshold level, determining that the spoken trigger phrase is not acceptable for trigger phrase model training.

Example 3

The method of example 2, wherein the threshold level is −50 dB.

Example 4

A method comprising: recording an audio signal including a spoken trigger phrase; estimating the length of the spoken trigger phrase in the audio signal; determining whether the estimated length of the spoken trigger phrase is less than a lower trigger phrase length threshold; and if the estimated length of the spoken trigger phrase is less than the lower trigger phrase length threshold, rejecting the spoken trigger phrase for trigger phrase model training.

Example 5

The method of example 4, wherein the estimating of the length of the spoken trigger phrase comprises counting the number of frames in the audio signal having voice activity.

Example 6

The method of example 4, wherein the lower trigger phrase length threshold is 70 frames.

Example 7

A method comprising: recording an audio signal including a spoken trigger phrase; estimating the length of the spoken trigger phrase in the audio signal; and determining whether the estimated length of the spoken trigger phrase is greater than a higher trigger phrase length threshold; and if the estimated length of the spoken trigger phrase is greater than the higher trigger phrase length threshold, rejecting the spoken trigger phrase for trigger phrase model training.

Example 8

The method of example 7, wherein the estimating of the length of the spoken trigger phrase comprises counting the number of frames having voice activity in the audio signal.

Example 9

The method of example 7, wherein the higher trigger phrase length threshold is 180 frames.

Example 10

A method comprising: recording an audio signal including a spoken trigger phrase; measuring a number of segments in the audio signal having voice activity; comparing the measured number of segments to a threshold value; determining, based on the comparing step, whether the spoken trigger phrase is acceptable for trigger phrase model training; and if the spoken trigger phrase is determined not to be acceptable for trigger phrase model training, rejecting the spoken trigger phrase for trigger phrase model training.

Example 11

The method of example 10, wherein the determining step comprises: determining whether the measured number of segments is greater than the threshold value; and if the measured number of segments is determined to be greater than the threshold value, determining that the spoken trigger phrase is not acceptable for trigger phrase model training.

Example 12

The method of example 10, wherein the threshold value is based on an offline analysis of the trigger phrase.

Example 13

A method comprising: recording an audio signal including a spoken trigger phrase; measuring the length of the shortest segment in the audio signal having voice activity; comparing the measured length of the shortest segment to a threshold value; determining, based on the comparing step, whether the spoken trigger phrase is acceptable for trigger phrase model training; and if the spoken trigger phrase is determined not to be acceptable for trigger phrase model training, rejecting the spoken trigger phrase for trigger phrase model training.

Example 14

The method of example 13, wherein the determining step comprises: determining whether the measured length of the shortest segment is less than the threshold value; and if the measured length of the shortest segment is determined to be less than the threshold value, determining that the spoken trigger phrase is not acceptable for trigger phrase model training.

Example 15

The method of example 14, wherein the threshold value is 27 frames.

Example 16

A method comprising: recording an audio signal including a spoken trigger phrase; calculating a measure of noise variability of background noise for each frame in the audio signal; comparing the measure of noise variability of background noise for each frame to a first threshold value; counting the number of frames in the audio signal for which the measure of noise variability of the background noise is higher than the first threshold value; comparing the counted number of frames to a second threshold value; determining, based on the counted number of frames, whether the spoken trigger phrase is acceptable for trigger phrase model training; and if the spoken trigger phrase is determined not to be acceptable for trigger phrase model training, rejecting the spoken trigger phrase for trigger phrase model training.

Example 17

The method of example 16, wherein the determining step comprises: determining whether the counted number of frames is equal to or greater than the second threshold value; and if the counted number of frames is determined to be equal to or greater than the second threshold value, determining that the spoken trigger phrase is not acceptable for trigger phrase model training.

Example 18

The method of example 17, wherein the first threshold value is 0.7 and the second threshold value is 20.

Example 19

The method of example 16, wherein the measure of noise variability of the background noise is calculated using the following equation:

$$MNV = \frac{1}{NC \times nb} \sum_{k=1}^{NC} \sum_{l=1}^{nb} \frac{(D\_smooth(k, l) - D\_smooth\_low(k, l))}{(D\_smooth\_high(k, l) - D\_smooth\_low(k, l))},$$

wherein MNV denotes the measure noise variability of the background noise in the audio signal, NC denotes a number of channels in the audio signal, nb+1 denotes a number of contiguous noise frames in the audio signal, k denotes a channel index, l denotes a look-back index, D_smooth(k, l) denotes a smoothed maximum dB difference of smoothed channel noise, D_smooth_high(k, l) denotes a high boundary point that represents noise exhibiting high variability, and D_smooth_low (k, l) denotes a low boundary point that represents noise exhibiting low variability.

Example 20

A device comprising: a microphone that receives an audio signal that includes a spoken trigger phrase; a processor that is electrically coupled to the microphone, wherein the processor: measures characteristics of the audio signal; determines, based on the measured characteristics, whether the spoken trigger phrase is acceptable for trigger phrase model training; and if the spoken trigger phrase is determined not to be acceptable for trigger phrase model training, rejects the trigger phrase for trigger phrase model training.

Example 21

The device of example 20, wherein the processor further: measures a background noise level in the audio signal; compares the measured background noise level to a threshold level; determines whether the measured background noise level is greater than the threshold level; and if the measured background noise is determined to be greater than the threshold level, determines that the spoken trigger phrase is not acceptable for trigger phrase model training.

Example 22

The device of example 20, wherein the processor further: estimates the length of the spoken trigger phrase in the audio signal; determines whether estimated length of the spoken trigger phrase is less than a lower trigger phrase length threshold; and if the estimated length of the spoken trigger phrase is less than the lower trigger phrase length threshold, determines that the spoken trigger phrase is not acceptable for trigger phrase model training.

Example 23

The device of example 20, wherein the processor further: estimates the length of the spoken trigger phrase in the audio signal; determines whether the estimated length of the spoken trigger phrase is greater than a higher trigger phrase length threshold; and if the estimated length of the spoken trigger phrase is greater than the higher trigger phrase length threshold, determines that the spoken trigger phrase is not acceptable for trigger phrase model training.

Example 24

The device of example 20, wherein the processor further: measures a number of segments in the audio signal having voice activity; compares the number of segments measured to a threshold value; determines whether the measured number of segments is greater than the threshold value; and if the measured number of segments is determined to be greater than the threshold value, determines that the spoken trigger phrase is not acceptable for trigger phrase model training.

Example 25

The device of example 20, wherein the processor further: measures the length of the shortest segment in the audio signal having voice activity; compares the measured length of the shortest segment to a threshold value; determining whether the measured length of the shortest segment is less than a threshold value; and if the measured length of the shortest segment is less than the threshold value, determines that the spoken trigger phrase is not acceptable for trigger phrase model training.

Example 26

The device of example 20, wherein the processor further: calculates a measure of noise variability of background noise for each frame in the audio signal; compares the measure of noise variability of background noise for each frame to a first threshold value; counts the number of frames in the audio signal for which the measure of noise variability of the background noise is higher than the first threshold value; compares the counted number of frames to a second threshold value; determines whether the counted number of frames is equal to or greater than the second threshold value; and if the counted number of frames is equal to or greater than the second threshold value, determines that the spoken trigger phrase is not acceptable for trigger phrase model training.

It can be seen from the foregoing that a method for apparatus for evaluating trigger phrase enrollment for trigger phrase training has been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A method of training a trigger phrase model, the method comprising:
during a trigger phrase enrollment process:
prompting, by a speech recognition-enabled electronic device, a first user of the speech recognition-enabled electronic device to speak a training phrase;
receiving, at the speech recognition-enabled electronic device, a first audio signal corresponding to the first user speaking the training phrase;
determining, by the speech recognition-enabled electronic device, a first number of frames in the first audio signal that have a measure of noise variability of background noise exceeding a noise variability threshold;
determining, by the speech recognition-enabled electronic device, a second number of frames in the first audio signal that have voice activity; and
training, by the speech recognition-enabled electronic device, with the first audio signal corresponding to the first user speaking the training phrase, the trigger phrase model to adapt to a voice of the user of the speech recognition-enabled device and detect a trigger phrase in an utterance,
wherein the speech recognition-enabled electronic device, upon detecting the trigger phrase in utterances while in a sleep mode, is configured to use the trigger phrase model trained during the trigger phrase enrollment process to:
reject the trigger phrase when the trigger phrase is detected in utterances spoken by people other than the first user of the speech recognition-enabled electronic device; and
wake from the sleep mode when the trigger phrase is detected in utterances spoken by the first user of the speech recognition-enabled electronic device, the sleep mode comprising a power-saving mode of operation in which one or more parts of the speech recognition-enabled electronic device are in a low-power state or powered off, and
wherein training the trigger phrase model with the first audio signal comprises training the trigger phrase model with the first audio signal when the first number of frames in the first audio signal is less than a threshold value and when the second number of frames in the first audio signal is within a frame count threshold range.

2. The method of claim 1, further comprising, when the first number of frames in the first audio signal exceed the threshold value and when the second number of frames in the first audio signal is outside the frame count threshold range:

prompting, by the speech recognition-enabled electronic device, the first user to speak the trigger phrase again; and rejecting, by the speech recognition-enabled electronic device, the first audio signal corresponding to the first user speaking the training phrase for use in training the trigger phrase model.

3. A method of training a trigger phrase model, the method comprising:
during a trigger phrase enrollment process:
prompting, by a speech recognition-enabled electronic device, a first user of the speech recognition-enabled electronic device to speak a training phrase;
receiving, at the speech recognition-enabled electronic device, a first audio signal corresponding to the first user speaking the training phrase;
determining, by the speech recognition-enabled electronic device, a number of segments in the first audio signal that have voice activity, each segment comprising a corresponding sequence of continuous frames in the first audio signal that have voice activity; and
training, by the speech recognition-enabled electronic device, with the first audio signal corresponding to the first user speaking the training phrase, the trigger phrase model to adapt to a voice of the user of the speech recognition-enabled device and detect a trigger phrase in an utterance,
wherein the speech recognition-enabled electronic device, upon detecting the trigger phrase in utterances while in a sleep mode, is configured to use the trigger phrase model trained during the trigger phrase enrollment process to:
reject the trigger phrase when the trigger phrase is detected in utterances spoken by people other than the first user of the speech recognition-enabled electronic device; and
wake from the sleep mode when the trigger phrase is detected in utterances spoken by the first user of the speech recognition-enabled electronic device, the sleep mode comprising a power-saving mode of operation in which one or more parts of the speech recognition-enabled electronic device are in a low-power state or powered off, and
wherein training the trigger phrase model with the first audio signal comprises training the trigger phrase model with the first audio signal when the number of segments in the first audio signal that have voice activity satisfies a threshold value.

4. The method of claim 3, further comprising, when the number of segments in the first audio signal that have voice activity dissatisfy the threshold value:
prompting, by the speech recognition-enabled electronic device, the first user to speak the trigger phrase again; and
rejecting, by the speech recognition-enabled electronic device, the first audio signal corresponding to the first user speaking the trigger phrase for use in training the trigger phrase model.

5. A speech recognition-enabled electronic device comprising:
data processing hardware; and
memory hardware in communication with the data processing hardware and storing instructions, that when executed by the data processing hardware, cause the data processing hardware to perform operations comprising:

during a trigger phrase enrollment process:
prompting a first user of the speech recognition-enabled electronic device to speak a training phrase;
receiving a first audio signal corresponding to the first user speaking the training phrase;
determining a first number of frames in the first audio signal that have a measure of noise variability of background noise exceeding a noise variability threshold;
determining a second number of frames in the first audio signal that have voice activity; and
training, with the first audio signal corresponding to the first user speaking the training phrase, a trigger phrase model to adapt to a voice of the user of the speech recognition-enabled device and detect a trigger phrase in an utterance,
wherein the speech recognition-enabled electronic device, upon detecting the trigger phrase in utterances while in a sleep mode, is configured to use the trigger phrase model trained during the trigger phrase enrollment process to:
reject the trigger phrase when the trigger phrase is detected in utterances spoken by people other than the user of the speech recognition-enabled electronic device; and
wake from the sleep mode when the trigger phrase is detected in utterances spoken by the user of the speech recognition-enabled electronic device, the sleep mode comprising a power-saving mode of operation in which one or more parts of the speech recognition-enabled electronic device are in a low-power state or powered off, and
wherein training the trigger phrase model with the first audio signal comprises training the trigger phrase model with the first audio signal when the first number of frames in the first audio signal is less than a threshold value and when the second number of frames in the first audio signal is within a frame count threshold range.

6. The speech recognition-enabled electronic device of claim 5, wherein the operations further comprise, when the first number of frames in the first audio signal exceed the threshold value and when the second number of frames in the first audio signal is outside the frame count threshold range:
prompting the first user to speak the trigger phrase again; and
rejecting the first audio signal corresponding to the first user speaking the training phrase for use in training the trigger phrase model.

7. A speech recognition-enabled electronic device comprising:
data processing hardware; and
memory hardware in communication with the data processing hardware and storing instructions, that when executed by the data processing hardware, cause the data processing hardware to perform operations comprising:
during a trigger phrase enrollment process:
prompting a first user of the speech recognition-enabled electronic device to speak a training phrase;
receiving a first audio signal corresponding to the first user speaking the training phrase; and
determining a number of segments in the first audio signal that have voice activity, each segment comprising a corresponding sequence of continuous frames in the first audio signal that have voice activity; and training, with the first audio signal corresponding to the first user speaking the training phrase, a trigger phrase model to adapt to a voice of the user of the speech recognition-enabled device and detect a trigger phrase in an utterance, wherein the speech recognition-enabled electronic device, upon detecting the trigger phrase in utterances while in a sleep mode, is configured to use the trigger phrase model trained during the trigger phrase enrollment process to:

reject the trigger phrase when the trigger phrase is detected in utterances spoken by people other than the user of the speech recognition-enabled electronic device; and wake from the sleep mode when the trigger phrase is detected in utterances spoken by the user of the speech recognition-enabled electronic device, the sleep mode comprising a power-saving mode of operation in which one or more parts of the speech recognition-enabled electronic device are in a low-power state or powered off, and wherein training the trigger phrase model with the first audio signal comprises training the trigger phrase model with the first audio signal when the number of segments in the first audio signal that have voice activity satisfies a threshold value.

8. The speech recognition-enabled electronic device of claim 7, wherein the operations further comprise, when the number of segments in the first audio signal that have voice activity dissatisfy the threshold value:

prompting the first user to speak the trigger phrase again; and rejecting the first audio signal corresponding to the first user speaking the training phrase for use in training the trigger phrase model.

* * * * *